United States Patent
Abe

(10) Patent No.: US 7,835,412 B2
(45) Date of Patent: Nov. 16, 2010

(54) LASER CONTROL SYSTEM, OPTICAL SCANNING DEVICE, AND IMAGE FORMING APPARATUS

(75) Inventor: Yasuhiro Abe, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 298 days.

(21) Appl. No.: 12/004,408

(22) Filed: Dec. 21, 2007

(65) Prior Publication Data

US 2008/0212627 A1    Sep. 4, 2008

(30) Foreign Application Priority Data

Dec. 25, 2006  (JP) .............................. 2006-346873

(51) Int. Cl.
*H01S 3/00* (2006.01)
(52) U.S. Cl. .............................. 372/38.02; 372/29.012; 372/29.021; 372/38.1; 372/38.01; 372/38.04; 372/38.07
(58) Field of Classification Search ................ 372/38.1, 372/38.02, 38.07, 29.012, 29.021, 38.01, 372/38.04

See application file for complete search history.

(56) References Cited

U.S. PATENT DOCUMENTS 6,154,473 A * 11/2000 Watanabe ................ 372/38.02
6,310,901 B1 * 10/2001 Mahmoudi et al. ........ 372/38.02
6,842,469 B2 * 1/2005 Nagara ..................... 372/38.02
2006/0291512 A1 * 12/2006 Borschowa .............. 372/38.02

FOREIGN PATENT DOCUMENTS

JP    2006-166349    6/2006

* cited by examiner

*Primary Examiner*—Minsun Harvey
*Assistant Examiner*—Yuanda Zhang
(74) *Attorney, Agent, or Firm*—Dickstein Shapiro LLP

(57) ABSTRACT

A control system for a laser source driven by a direct current drive voltage includes a system control board, a laser driver, and a power stabilizing circuit. The system control board is configured to output a control signal based on input data. The laser driver is coupled to the laser source and to the system control board. The laser driver is configured to drive the laser source with the drive voltage to generate a laser beam modulated according to the control signal. The power stabilizing circuit is configured to regulate the drive voltage to a given constant level. The power stabilizing circuit includes a first circuit and a second circuit. The first circuit is configured to boost the drive voltage to a level exceeding the given constant level. The second circuit is configured to limit the boosted drive voltage to the given constant level.

18 Claims, 12 Drawing Sheets

LASER CONTROL SYSTEM, OPTICAL SCANNING DEVICE, AND IMAGE FORMING APPARATUS

CROSS-REFERENCE TO RELATED APPLICATIONS

This application claims priority from Japanese Patent Application No. 2006-346873, filed on Dec. 25, 2006 in the Japanese Patent Office, the entire contents of which are incorporated by reference herein.

FIELD OF THE INVENTION

The present invention relates to a laser control system, an optical scanning device, and an image forming apparatus, and more particularly, to a laser control system for driving a laser source with a stabilized voltage, and an optical scanning device and an electrophotographic image forming apparatus incorporating the laser control system.

BACKGROUND OF THE INVENTION

Laser sources are used in image forming apparatuses such as digital copiers and laser printers that produce images using electrophotography. In an electrophotographic process, an optical scanning unit having a laser source emits a modulated laser beam according to image data. The laser beam is projected onto a motor-driven polygon mirror rotating at a constant speed and reflected to scan a photoconductor surface line by line to obtain an electrostatic latent image. The latent image is subjected to subsequent development and transfer processes, where a visible image is developed with a developer, such as toner, and transferred to a recording sheet to obtain a printed output.

Typically, a laser source used in an image forming apparatus includes a laser diode (LD) provided with a driver circuit. The LD and the driver circuit are mounted together on an LD driver board that derives a substantially constant supply voltage from a direct current (DC) power supply, which may be used in common with a load circuit included in the image forming apparatus. Such a supply voltage can suffer fluctuations during laser emission when the load circuit consumes a large amount of power fluctuating over time, and these voltage fluctuations may occur in different degrees and/or manners depending on operations performed by the load circuit.

Referring to FIGS. 1A and 1B, charts showing the supply voltage for a non-operating state (FIG. 1A) and an operating state (FIG. 1B) of the load circuit are described.

As shown in FIG. 1A, the supply voltage remains constant at Vc when the load circuit is in the non-operating state. During laser emission, the load circuit carries out a given function to consume a large amount of power derived from the common DC power supply, causing fluctuations in the supply voltage. As shown in FIG. 1B, the supply voltage periodically oscillates with constant amplitude "A" and period "B" when the load circuit is in the operating state.

Such fluctuations in voltage applied to an LD driver board may result in defects in laser emission, leading to defective images produced through the laser emission. For example, voltage oscillations like those shown in FIG. 1B may cause inconsistencies in density of a produced image, commonly referred to as "banding".

Referring to FIG. 2, an example of output graphics produced with a banding defect is described. As shown in FIG. 2, the graphic output has density inconsistencies that appear as a repeating stripe pattern. Each stripe of the banding pattern has a varying density in a constant width "b" resulting from the oscillating voltage, where the amplitude and period of the voltage oscillations correspond to the density range and width of the repeating stripes.

Several attempts have been made to remove voltage fluctuations and achieve stable laser operation in an electrographic process. One approach is to use a filter such as a capacitor that eliminates selected frequencies from a voltage supplied to a load circuit. This approach may be applied to an image forming apparatus having an optical reading unit and scanning unit which operate asynchronously using a common power supply. By inserting a filter in a power supply line of the reading unit, undesired frequencies or variations in a voltage applied to the reading unit can be eliminated to prevent fluctuations in a voltage supplied to the scanning unit.

A drawback of such a filter-based approach is that it requires accurate calculation to specify a filter suitable for a particular load circuit. In addition, a product having a plurality of load circuits powered from a common power supply each requiring a dedicated filter may be costly to manufacture. Hence, there is still a need for a system capable of effectively suppressing voltage fluctuations at low cost that can be applied to an optical scanning device to achieve stable laser operation in an electrophotographic process.

BRIEF SUMMARY OF THE INVENTION

This patent specification describes a novel control system for a laser source capable of driving the laser source with a stabilized voltage.

In one embodiment, the novel control system for a laser source driven by a direct current drive voltage includes a system control board, a laser driver, and a power stabilizing circuit. The system control board is configured to output a control signal based on input data. The laser driver is coupled to the laser source and to the system control board. The laser driver is configured to drive the laser source with the drive voltage to generate a laser beam modulated according to the control signal. The power stabilizing circuit is configured to regulate the drive voltage to a given constant level. The power stabilizing circuit includes a first circuit and a second circuit. The first circuit is configured to boost the drive voltage to a level exceeding the given constant level. The second circuit is configured to limit the boosted drive voltage to the given constant level.

This patent specification also describes a novel optical scanning device capable of driving a laser source with a stabilized voltage.

In one embodiment, the novel optical scanning device includes a scanning system, a laser source, a system control board, a laser driver, and a power stabilizing circuit. The scanning system is configured to scan an object surface with a laser beam. The laser source is configured to emit the laser beam. The laser source is driven by a direct current drive voltage. The system control board is configured to output a control signal based on input data. The laser driver is coupled to the laser source and to the system control board. The laser driver is configured to drive the laser source with the drive voltage to generate a laser beam modulated according to the control signal. The power stabilizing circuit is configured to regulate the drive voltage to a given constant level. The power stabilizing circuit includes a first circuit and a second circuit. The first circuit is configured to boost the drive voltage to a level exceeding the given constant level. The second circuit is configured to limit the boosted drive voltage to the given constant level.

This patent specification also describes a novel image forming apparatus capable of driving a laser source with a stabilized voltage.

In one embodiment, the novel image forming apparatus includes an optical scanning unit. The optical scanning unit is configured to form an electrostatic latent image on a photoconductor surface. The optical scanning unit includes a scanning system. The scanning system is configured to scan the photoconductor surface with a laser beam. The laser source is configured to emit the laser beam. The laser source is driven by a direct current drive voltage. The system control board is configured to output a control signal based on image data. The laser driver is coupled to the laser source and to the system control board. The laser driver is configured to drive the laser source with the drive voltage to generate a laser beam modulated according to the control signal. The power stabilizing circuit is configured to regulate the drive voltage to a given constant level. The power stabilizing circuit includes a first circuit and a second circuit. The first circuit is configured to boost the drive voltage to a level exceeding the given constant level. The second circuit is configured to limit the boosted drive voltage to the given constant level.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

Figure 1A:
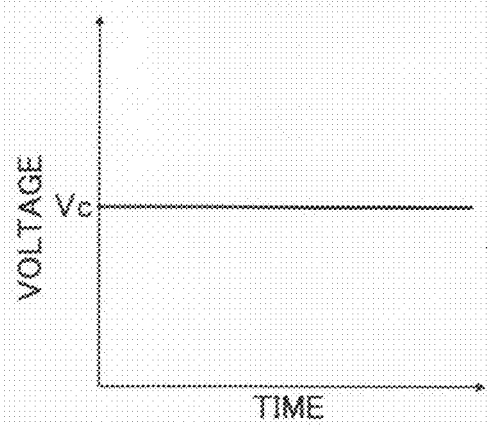
FIGS. 1A and 1B are charts showing a supply voltage for a background laser diode driver.
Figure 1B:
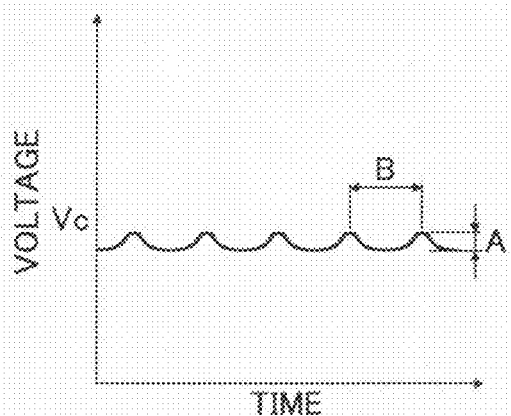

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve a similar result.

Referring now to the drawings, wherein like reference numerals designate identical or corresponding parts throughout the several views, example embodiments of the present patent application are described.

Figure 3:
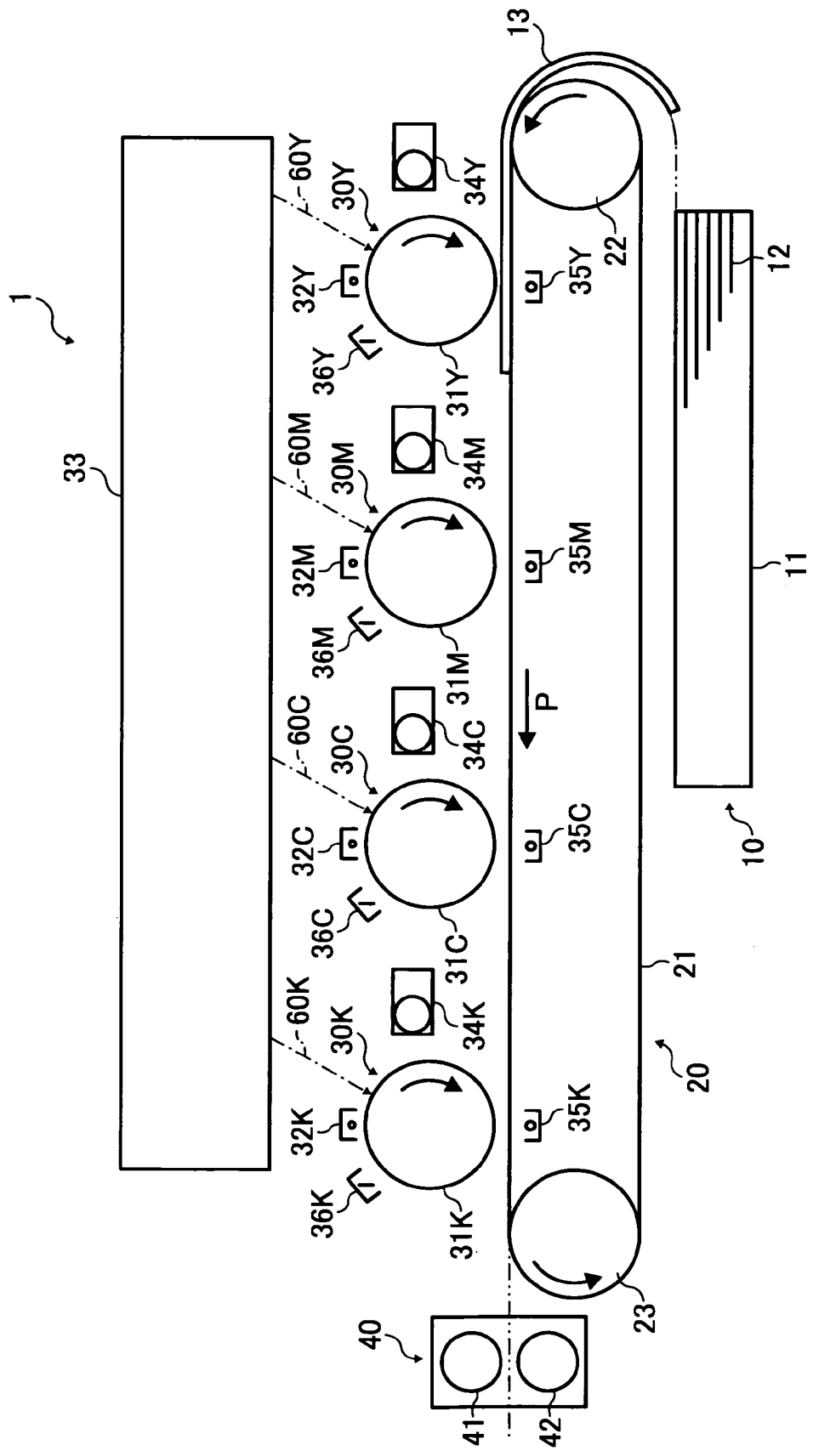
FIG. 3 illustrates an image forming apparatus according to at least one example embodiment of this patent specification.

Referring to FIG. 3 of the drawings, an image forming apparatus 1 according to at least one example embodiment of this patent specification is described.

In FIG. 3, the image forming apparatus 1 includes a sheet feed unit 10, a conveying unit 20, image forming units 30Y, 30M, 30C, and 30K, a scanning unit 33, and a fixing unit 40.

In the image forming apparatus 1, the sheet feed unit 10 includes a sheet tray 11, a sheet stack 12, a feeding mechanism such as a feed roller and a separating member, not shown, and a registration mechanism such as a pair of rollers, not shown.

The conveying unit 20 includes a drive roller 22, a driven roller 23, a conveyor belt 21 stretched therebetween, and a driving mechanism such as a motor, not shown.

Each of the image forming units 30Y, 30M, 30C, and 30K has a photoconductor 31Y, 31M, 31C, and 31K, a charging unit 32Y, 32M, 32C, and 32K, a development unit 34Y, 34M, 34C, and 34K, a transfer unit 35Y, 35M, 35C, and 35K, a cleaning unit 36Y, 36M, 36C, and 36K, and a discharging unit, not shown, respectively. The scanning unit 33 provides modulated laser beams 60Y, 60M, 60C, and 60K according to image data to each of the image forming units 30Y, 30M, 30C, and 30K, respectively.

The fixing unit 40 includes a fixing roller 41, a pressure roller 42, and a pair of output rollers adjacent to an output tray, not shown.

In this patent specification, suffix letters "Y", "M", "C", and "K" assigned to reference numerals denote toner colors used in the image forming apparatus 1, where "Y" denotes yellow, "M" for magenta, "C" for cyan, and "K" for black. Each of these suffix letters is used to refer to components having functions associated with a particular toner color and/or signals relevant to forming a sub-image of such toner color. Consequently, components marked with a same suffix will be regarded as elements associated with each other, while components marked with a same numeric character will be regarded as equivalent and/or corresponding elements. For ease of illustration and explanation, the following portions of the specification will primarily address one image forming unit 36Y and components and procedures associated therewith.

In operation, in the sheet feed unit 10, the feeding mechanism removes an individual sheet 13 from the sheet stack 12 to the registration mechanism. The registration mechanism moves the sheet 13 at a given time into the conveying unit 20.

In the conveying unit 20, the driving mechanism rotates the drive roller 22 to rotate the conveyor belt 21 in a direction of arrow P. The sheet 13 supplied from the sheet feed unit 10 is attracted by electrostatic force to the conveyor belt 21 and conveyed thereon to pass through the image forming units 30Y, 30M, 30C, and 30K.

In the image forming unit 30Y, the photoconductor 31Y is rotated clockwise in FIG. 3. The charging unit 32Y uniformly charges a surface of the rotating photoconductor 31Y. The photoconductor 31Y receives the laser beam 60Y from the scanning unit 33 so as to form an electrostatic latent image thereon. The development unit 34Y converts the electrostatic latent image to a visible toner image by applying yellow toner particles to the photoconductor 31Y. Then, the sheet 13 conveyed by the conveying unit 20 enters a gap defined by the conveyor belt 21 and the photoconductor 31Y. The transfer unit 35Y supplies a transfer voltage between the conveyor belt 21 and the photoconductor 31Y to transfer the toner image onto the sheet 13. After the transfer of the toner image, the cleaning unit 36Y removes residual toner particles and the discharging unit removes the charge from the surface of the photoconductor 31Y.

Thereafter, the image forming units 30M, 30C, and 30K perform a similar process so that yellow, magenta, cyan, and black sub-images are sequentially formed and superimposed one atop another to form a full color image on the sheet 13. The sheet 13 traveling past the image forming units 30 is detached from the conveyor belt 21 and enters the fixing unit 40.

In the fixing unit 40, the fixing roller 41 and the pressure roller 42 rotate in synchrony. The sheet 13 from the conveying unit 20 enters a nip defined by the fixing roller 41 and the pressure roller 42 pressed against each other with a given force, where the fixing roller 42 is heated to a given temperature with an internal heater, so that the color image is fixed on the sheet 13 with heat and pressure. After the fixing of the color image, the pair of output rollers conveys the sheet 13 to the output tray.

Figure 4:
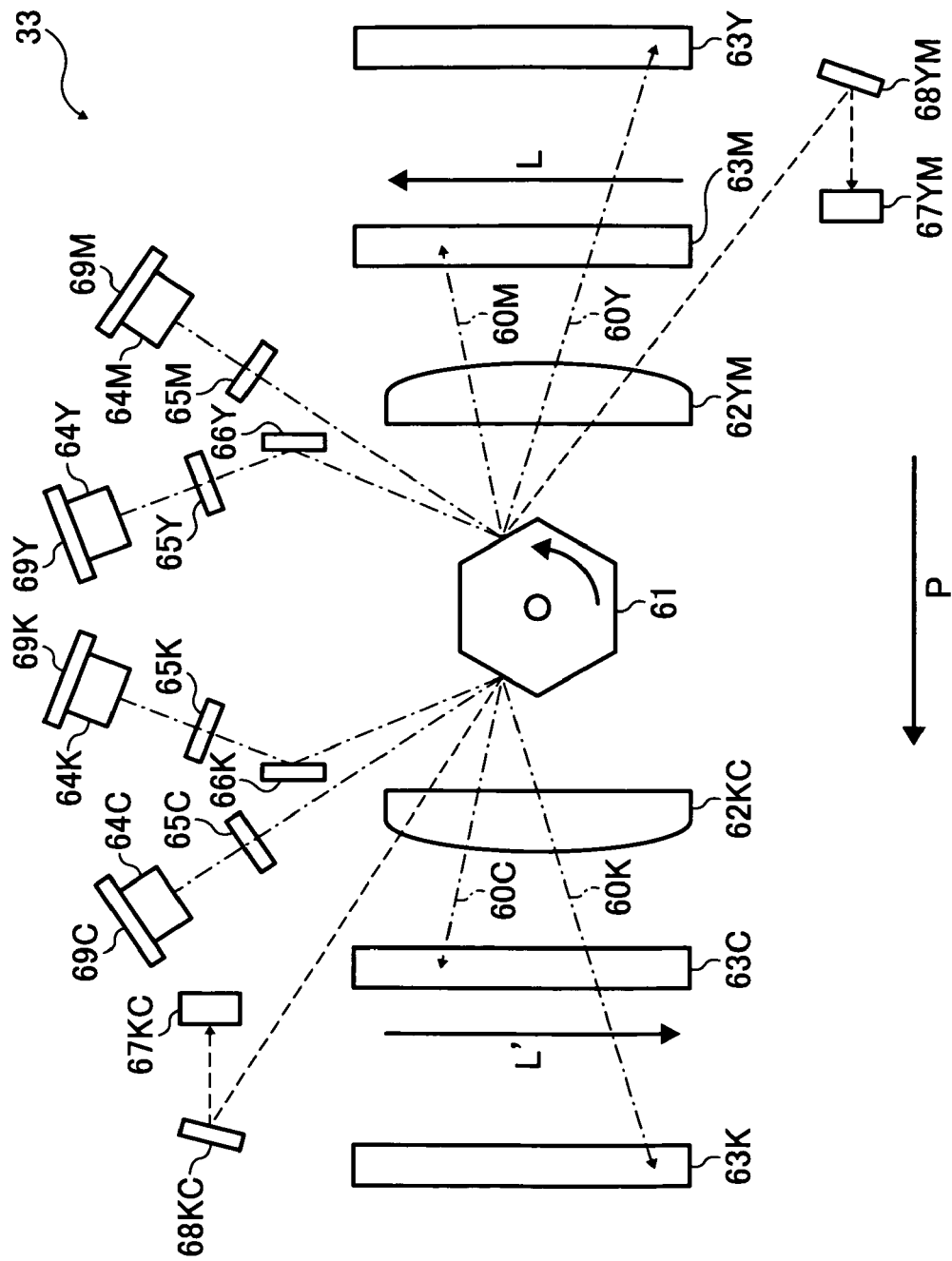
FIG. 4 is a top view illustrating an example of a scanning unit included in the image forming apparatus of FIG. 3.

Referring now to FIG. 4, a top view illustrating an example of the scanning unit 33 is described.

In FIG. 4, the scanning unit 33 includes a polygon mirror 61, f-theta lenses 62YM and 62KC, and mirrors 63Y, 63M, 63C, and 63K. Further, the scanning unit 33 includes laser diode (LD) driver boards 69Y, 69M, 69C, and 69K, laser sources 64Y, 64M, 64C, and 64K, collimating lenses 65Y, 65M, 65C, and 65K, and reflection mirrors 66Y and 66K. The scanning unit 33 also includes synchronization sensors 67YM and 67KC with reflection mirrors 68YM and 68KC.

As shown in FIG. 4, the scanning unit 33 extends in the direction of arrow P with the polygon mirror 61 centrally located, where components for yellow and magenta sub-image formation and components for cyan and black sub-image formation are symmetrically disposed on opposite sides of the polygon mirror 61. Although only one polygon mirror 61 is shown in FIG. 4, in another embodiment, the scanning unit 33 may use a different polygon mirror for each of the laser sources 64Y, 64M, 64C, and 64K with an appropriate configuration.

In operation, the laser sources 64Y, 64M, 64C, and 64K emit the modulated laser beams 60Y, 60M, 60C, and 60K according to signals transmitted from the LD driver boards 69Y, 69M, 69C, and 69K, respectively. Each of the laser beams 60M and 60C passes through an associated one of the collimating lenses 65M and 65C to reach a facet of the polygon mirror 61. Each of the laser beams 60Y and 60K passes through an associated one of the collimating lenses 65Y and 65K, then is reflected off an associated one of the reflection mirrors 66Y and 66K to reach a facet of the polygon mirror 61.

Figure 2:
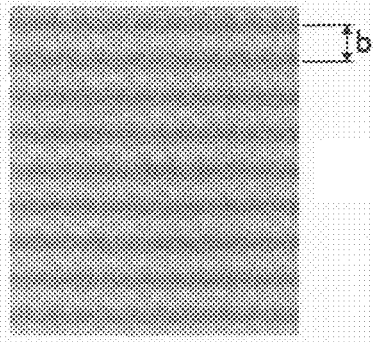
FIG. 2 illustrates an example of output graphics produced with a banding defect.

The polygon mirror 61 is rotated counterclockwise in FIG. 2. Each of the laser beams 60Y, 60M, 60C, and 60K is reflected off the rotating polygon mirror 61 to reach an associated one of the mirrors 63Y, 63M, 63C, and 63K through an associated one of the f-theta lenses 62YM and 62KC. The laser beams 60Y and 60M sweep across the mirrors 63Y and 63M in a direction indicated by arrow L, which is a main scanning direction thereof. The laser beams 60C and 60K sweep across the mirrors 63C and 63K in a direction indicated by arrow L', which is a main scanning direction thereof.

Thus, the laser beams 60Y, 60M, 60C, and 60K are projected to scan the photoconductors 31Y, 31M, 31C, and 31K at a constant speed. The components of the optical unit 33 are properly designed to provide each laser beam with a stabilized spot size at a scan position.

Further, the laser beams 60Y and 60M are directed to the reflection mirror 68YM when reflected off the polygon mirror 61 at a given angle. The laser beams 60Y and 60M strike the polygon mirror 61 at different incident angles to reach the synchronization sensor 67YM at different times, so that the reflection mirror 68YM reflects the laser beams 60Y and 60M to the synchronization sensor 67YM at different times. The synchronization sensor 67YM outputs a detection signal occurring as periodic pulses corresponding to the incoming laser beams 60Y and 60M. The detection signal thus obtained is used for timing control in the LD driver boards 69Y and 69M.

Likewise, the laser beams 60C and 60K are reflected off the reflection mirror 68KC to reach the synchronization sensor 67KC, which outputs a detection signal occurring as periodic pulses corresponding to the incoming laser beams 60C and 60K. The detection signal thus obtained is used for timing control in the LD driver boards 69K and 69C.

The scanning unit 33 described above incorporates a laser control system 100 including the LD driver boards 69Y, 69M, 69C, and 69K on which the laser sources 64Y, 64M, 64C, and 64K are mounted. The laser control system 100 performs laser emission in the electrophotographic process based on image data and voltage supplied from the image forming apparatus 1.

Figure 5:
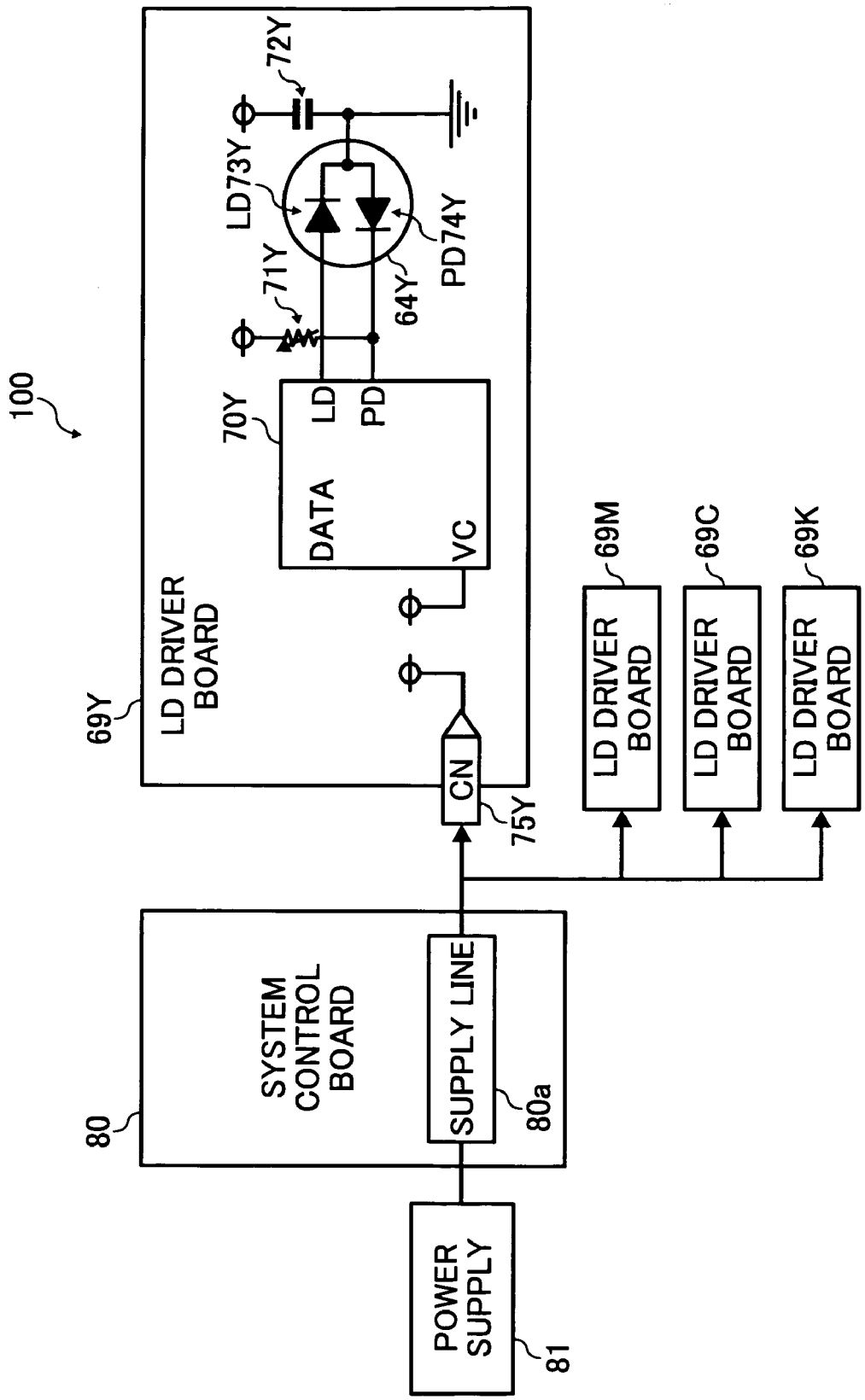
FIG. 5 is a block diagram illustrating an example of a laser control system included in the scanning unit of FIG. 4.

Referring now to FIG. 5, a block diagram illustrating an example of the laser control system 100 is described.

In FIG. 5, the laser control system 100 includes the LD driver boards 69Y, 69M, 69C, and 69K and a system control board 80 having a supply line 80a connected to a power supply 81 of the image forming apparatus 1.

The LD driver board 69Y includes a control circuit 70Y, a variable resistor 71Y, a capacitor 72Y, and a connector 75Y connected to the supply line 80a. The LD driver 69Y is coupled to the laser source 64Y mounted thereon. The laser source 64Y has a laser diode (LD) 73Y and a photo diode (PD) 74Y enclosed in a housing, not shown.

Note that the LD driver boards 69Y, 69M, 69C, and 69K are substantially equivalent to each other in general structure and function. For ease of illustration and explanation, the following portions of the specification will primarily address one LD driver board 69Y and components and procedures associated therewith.

During operation, the system control board 80 receives image data and the detection signals for timing control. Based on the received data and signals, the system control board 80 generates control signals for each of the LD driver boards 69Y, 69M, 69C, and 69K.

In the LD driver board 69Y, the control circuit 70Y receives the control signals from the system control board 80 and a feedback signal from the PD 74Y. In accordance with the received signals, the control circuit 70Y drives the LD 73Y to turn on/off the laser beam 60Y, which is emitted through an aperture of the housing. The PD 74Y monitors emission power of the laser beam 60Y from a rear facet of the LD 73Y to output the feedback signal to the control circuit 70Y, so that the LD 73Y stably performs laser emission without being affected by changes in temperature.

The laser control system 100 described above includes a power supply system where the supply line 80a connects the power supply 81 to the LD driver boards 69Y, 69M, 69C, and 69K, respectively. The power supply 81 converts or rectifies commercial power to generate a direct current (DC) voltage used in the image forming apparatus 1. The DC voltage is transmitted to the power supply system, which distributes power to components connected with the supply line 80a.

In general, a DC voltage supplied to an LD driver in an electrophotographic process is prone to fluctuations due to various causes. For example, a load circuit that is powered by a power supply supplying an LD drive voltage can affect the LD drive voltage when consuming a large, amount of power during laser emission. This causes the LD drive voltage to oscillate over time, leading to inconsistencies in density of an output image, commonly referred to as "banding".

Figure 6A:
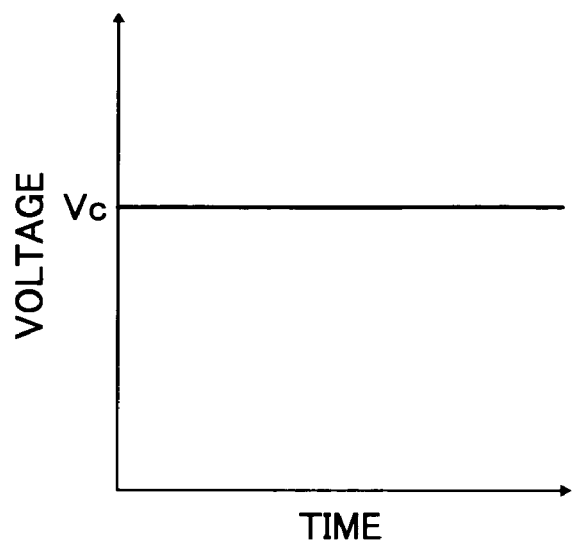
FIGS. 6A and 6B are charts illustrating an example of voltage deviation occurring in a laser diode drive voltage.
Figure 6B:
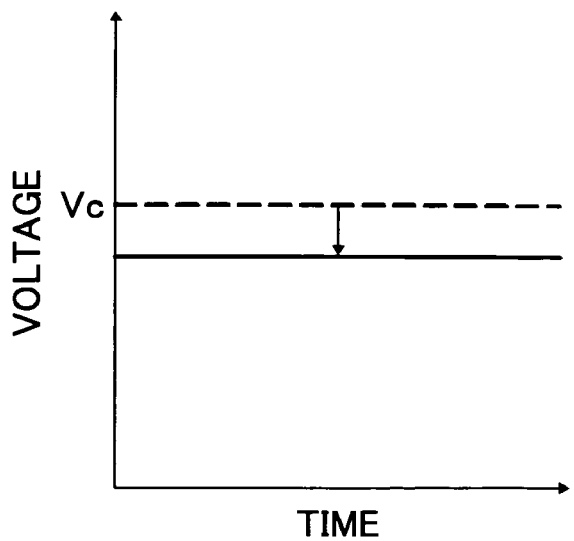

Further, if not affected by a load circuit, an LD drive voltage can deviate from a given constant value during laser emission. Referring to FIGS. 6A and 6B, charts illustrating an example of voltage deviation occurring in an LD drive voltage are described. The LD drive voltage, which remains constant at Vc before laser emission as shown in FIG. 6A, drops to a lower level during laser emission as shown in FIG. 6B. Under certain circumstances, such voltage deviation can occur by a significant amount, e.g., 200 mV, causing an initialization error in an LD driver using the LD drive voltage. Still further, an unexpected overvoltage condition can be caused in an LD driver for various reasons, resulting in abnormal LD operation.

In the laser control system 100 according to this patent specification, however, the power supply system is provided with a power stabilizing circuit 90 that provides voltage regulation to reduce fluctuations in LD drive voltages for the LD driver boards 69Y, 69M, 69C, and 69K.

Figure 7:
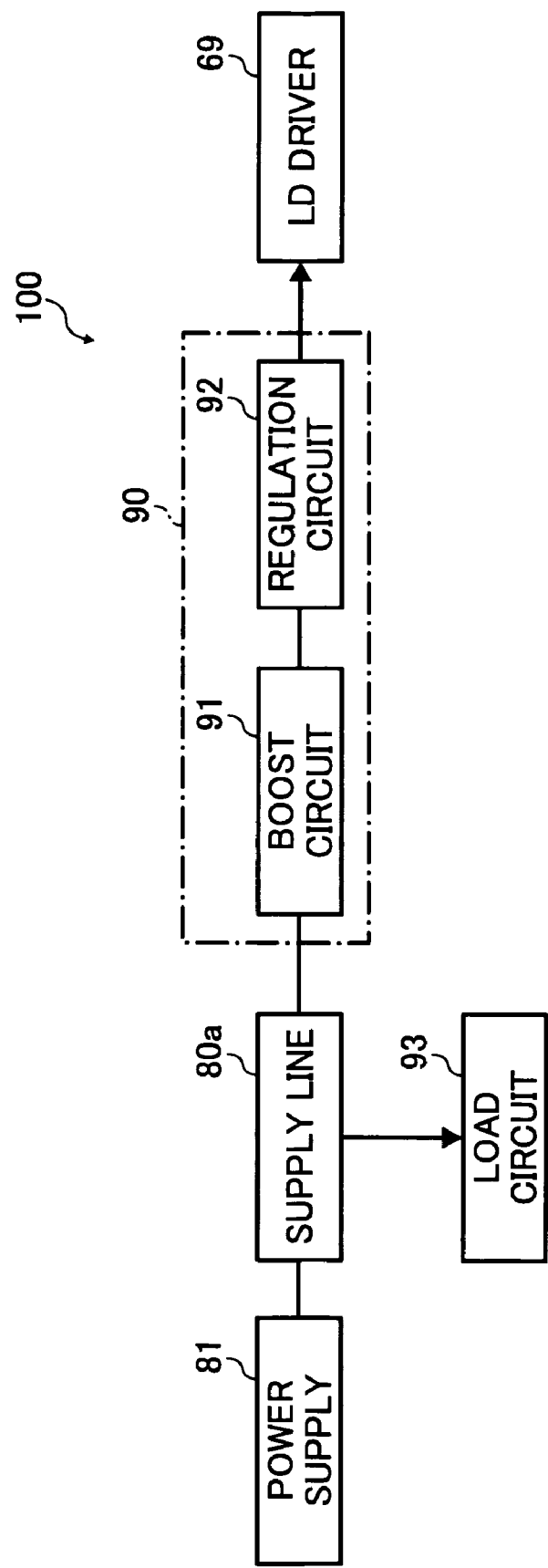
FIG. 7 is a block diagram illustrating a power supply system of the laser control system of FIG. 5 provided with a power stabilizing circuit.

Referring now to FIG. 7, a block diagram illustrating the power supply system with the power stabilizing circuit 90 is described.

In FIG. 7, the power supply system includes the power stabilizing circuit 90 having a boost circuit 91 and a regulation circuit 92. The power stabilizing circuit 90 is inserted between the supply line 80a and the LD driver boards 69Y, 69M, 69C, and 69K (hereinafter collectively referred to as "LD driver 69"). The supply line 80a is connected to a load circuit 93, such as a high capacity memory integrated circuit (IC), that consumes a large amount of power during laser emission.

In operation, the supply line 80a derives DC power from the power supply 81 and provides a supply voltage V0 to the laser control system 100. The supply line 80a also serves to provide a voltage to the load circuit 93. The supply voltage V0 is set to a given constant level Vc, but can deviate from Vc when, for example, affected by a change in the voltage consumed by the load circuit 93. The supply line 80a applies the supply voltage V0 to the power stabilizing circuit 90 for voltage regulation.

In the power stabilizing circuit 90, the boost circuit 91 converts the supply voltage V0 to a boosted voltage V0' and the regulation circuit 92 converts the boosted voltage V0' to a drive voltage V1 that is regulated to Vc. The drive voltage V1 thus obtained is supplied to the LD driver 69 to perform laser emission in the image forming process.

Figure 8A:
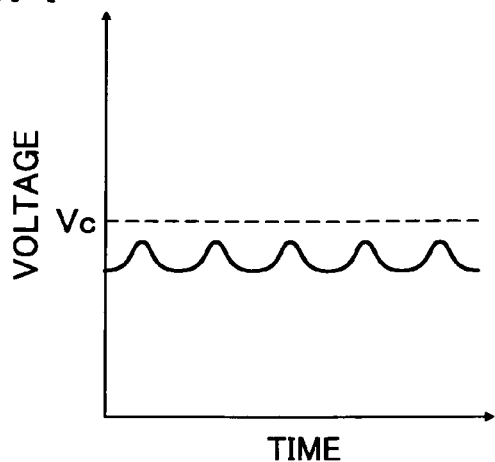
FIGS. 8A through 8C are charts illustrating how the power stabilizing circuit of FIG. 7 performs voltage regulation.
Figure 8B:
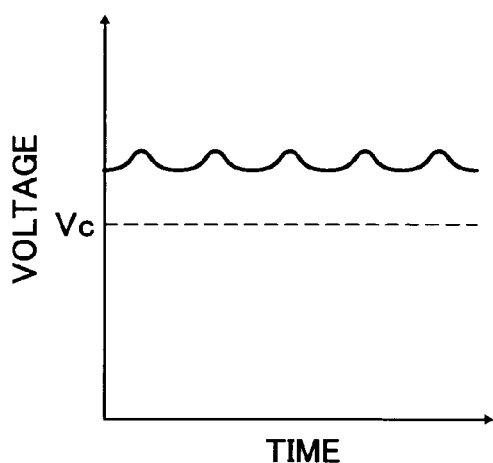
Figure 8C:
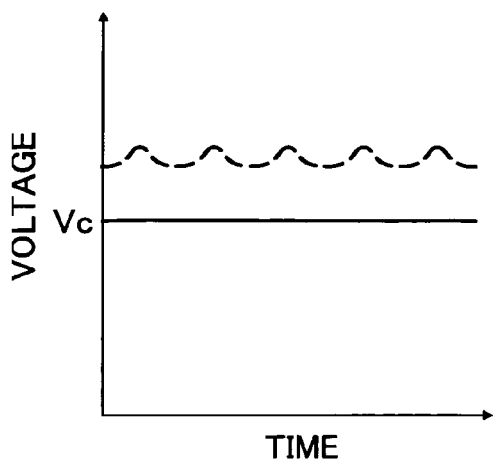

Referring to FIGS. 8A through 8C, charts illustrating how the power stabilizing circuit 90 performs voltage regulation are described.

First, the boost circuit 91 receives the supply voltage V0, which oscillates between two levels slightly lower than the given constant level Vc as shown in FIG. 8A. The boost circuit 91 adds a given voltage to the supply voltage V0 to obtain the boosted voltage V0', which still oscillates between two levels higher than Vc as shown in FIG. 8B. The regulation circuit 92 trims or cuts down the oscillating voltage V0' to Vc, thus obtaining the drive voltage V1 as shown in FIG. 8C. In the drive voltage V1, deviations and/or oscillations occurring in the supply voltage V0 are reduced to acceptable levels.

Figure 9:
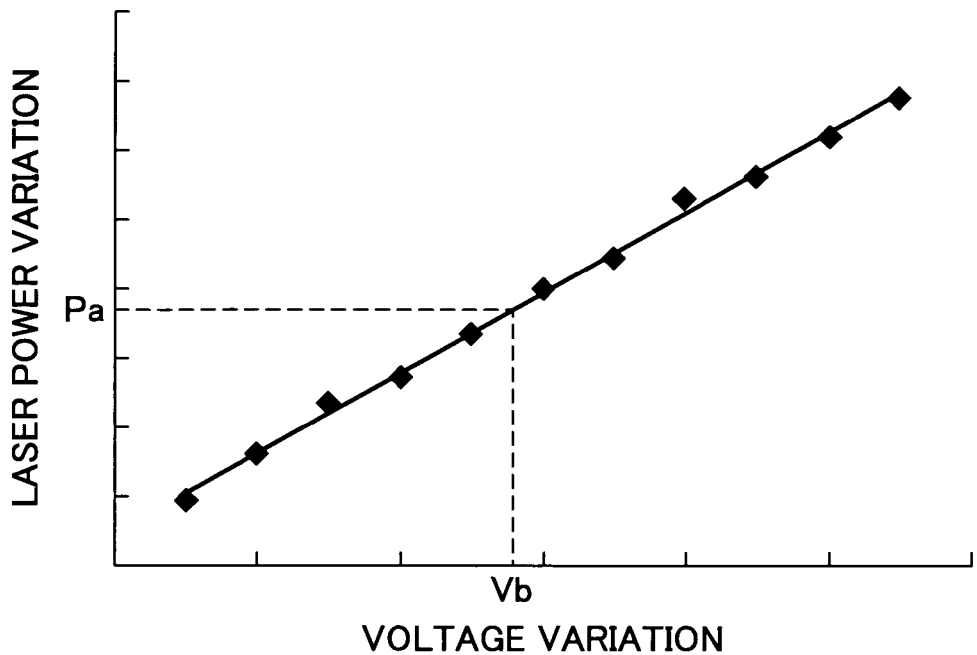
FIG. 9 is a chart illustrating a relation between variation in voltage applied to a laser source and variation in laser power exhibited by the laser source.

Referring to FIG. 9, a chart illustrating a relation between variation in voltage applied to a laser source and variation in laser power exhibited by the laser source is described.

As shown in FIG. 9, voltage and laser power vary substantially proportionally, such that, for example, a one-half reduction in the voltage variation can achieve a one-half reduction in the laser power variation. In the laser control system 100 according to this patent specification, the power stabilizing circuit 90 can provide the drive voltage V1 with variations below a set limit Vb, thus maintaining laser power variations below an acceptable level Pa. This provides good voltage stability in the laser control system 100, thus ensuring good image quality in the image forming apparatus 1.

In the power stabilizing circuit 90 described-above, the boost circuit 91 may preferably be a DC/DC converter, which can provide a desired output voltage corresponding to Vc by switched-mode conversion with low heat generation and reduced power loss. Since the switched-mode conversion may cause voltage spikes in the output voltage, it is desirable to select a DC/DC converter with adequate switching frequency so that the voltage spikes can be sufficiently eliminated by the regulation circuit 92.

Further, the regulation circuit 92 may preferably be a series regulator, i.e., a type of linear voltage regulator with an active control element connected in series with a load. This type of regulator is relatively small in size, and provides voltage regulation suitable for application to the power stabilizing circuit 90.

Figure 10:
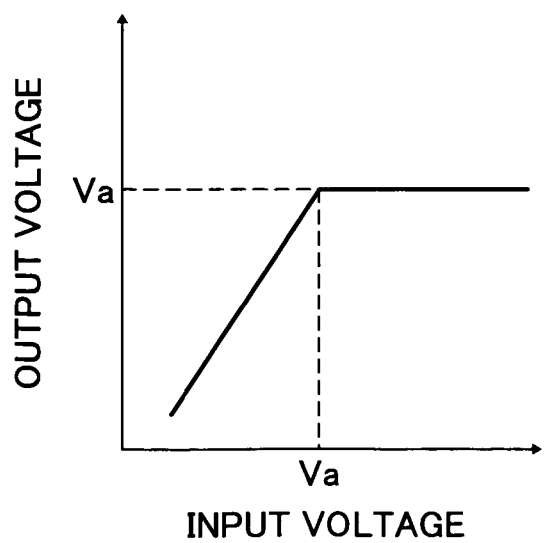
FIG. 10 is a chart illustrating regulation characteristics of a series regulator.

Referring to FIG. 10, a chart illustrating regulation characteristics of a series regulator is described. The horizontal axis represents voltage input to the series regulator and the vertical axis represents voltage output from the series regulator.

As shown in FIG. 10, the series regulator provides a substantially proportional output voltage for an input voltage that does not exceed a set value Va. The series regulator outputs Va for input voltages equal to or higher than Va. The series regulator draws the required voltage Va by expending excess power as heat. Although relatively inefficient, such a regulation scheme can provide stabilized voltage with reduced ripples and noise, and is highly desirable when the power stabilizing circuit 90 uses a DC/DC converter as the boost circuit 91. An appropriate series regulator can effectively reduce voltage spikes caused by switched-mode conversion, allowing a wide range of DC/DC converters to be used as the boost circuit 91.

Alternatively, the regulation circuit 92 may be a switching regulator. A switching regulator includes a switch turning on and off at a fixed frequency in the range of several tens to several hundreds of KHz, where the output voltage is controlled by varying the ratio of on and off times. Though prone to switching noise, such a regulation scheme provides voltage regulation with high power efficiency. Using a switching regulator with reduced switching noise may enhance efficiency in the power stabilizing circuit 90.

Still alternatively, the regulation circuit 92 may be a shunt regulator. A shunt regulator includes a control element connected in parallel with a load, where the control element allows a varying amount of current to obtain a desired output voltage across the load. Though inefficient and highly power-consuming even at idle, such a regulation scheme provides protection against current flow from a load circuit. Using a shunt regulator may enhance stability in the power stabilizing circuit 90.

Figure 11:
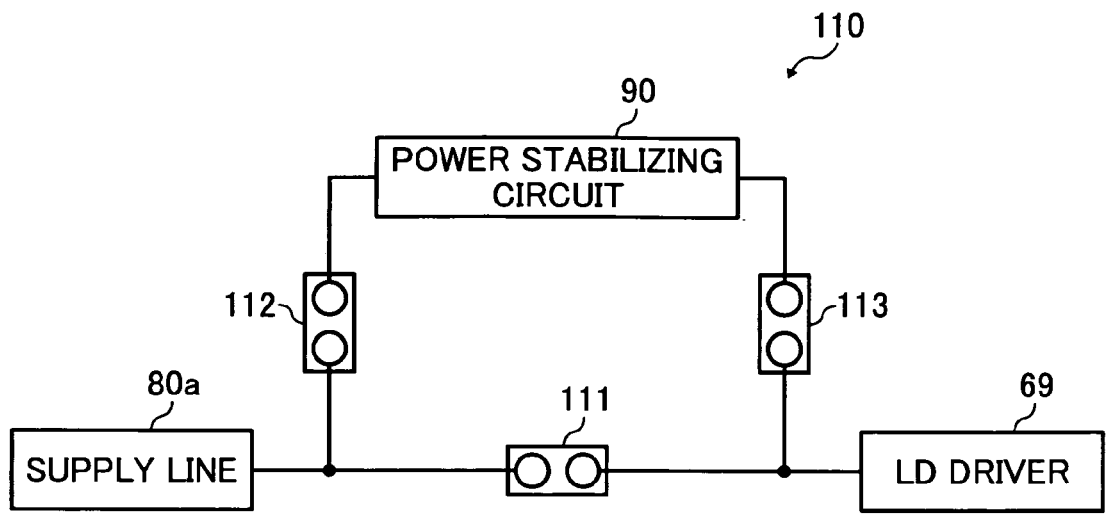
FIG. 11 is a schematic diagram illustrating an embodiment of the power stabilizing circuit of FIG. 7 provided in the laser control system of FIG. 5.

Referring now to FIG. 11, a schematic diagram illustrating an embodiment of the power stabilizing circuit 90 provided in the laser control system 100 is described.

In FIG. 11, the laser control system 100 includes a mode switching circuit 110. The mode switching circuit 110 includes jumper switches 111 through 113 interconnecting the power stabilizing circuit 90, the supply line 80a, and the LD driver 69.

As shown in FIG. 11, the jumper switch 111 is connected between the supply line 80a and the LD driver 69. The jumper switch 112 is connected between the supply line 80a and the power stabilizing circuit 90. The jumper switch 113 is connected between the power stabilizing circuit 90 and the LD driver 69.

During operation, the jumper switches 111 through 113 are turned on/off using jumper plugs, not shown, to change the operation mode of the laser control system 100. For example, with the jumper switch 111 turned on and the jumper switches 112 and 113 turned off, the laser control system 100 operates in a first mode. With the jumper switch 111 turned off and the jumper switches 112 and 113 turned on, the laser control system 100 operates in a second mode. In the first mode, the power stabilizing circuit 90 is deactivated and the supply line 80a supplies power directly to the LD driver 69. In the second mode, the power stabilizing circuit 90 is activated and the supply line 80a supplies power to the LD driver 69, stabilized through regulation by the power stabilizing circuit 90.

Figure 12:
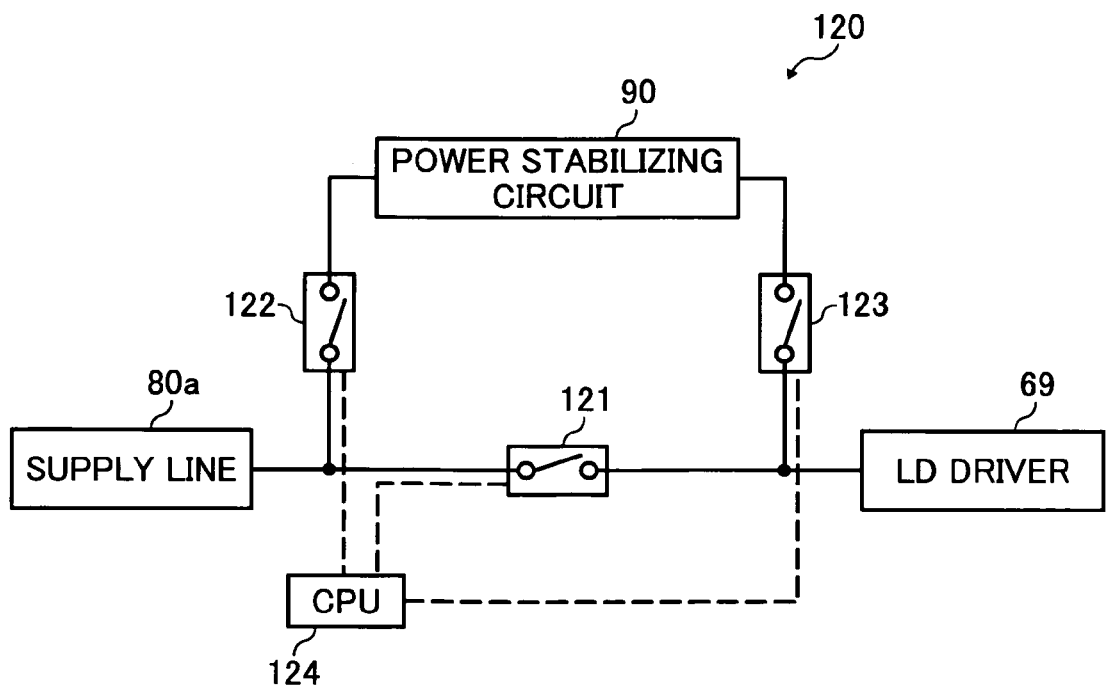
FIG. 12 is a schematic diagram illustrating another embodiment of the power stabilizing circuit of FIG. 7 provided in the laser control system of FIG. 5.

Referring to FIG. 12, a schematic diagram illustrating another embodiment of the power stabilizing circuit 90 provided in the laser control system 100 is described.

In FIG. 12, the laser control system 100 includes a mode switching circuit 120. The mode switching circuit 120 includes a central processing unit (CPU) 124, and switching ICs 121 through 123 interconnecting the power stabilizing circuit 90, the supply line 80a, and the LD driver 69.

As shown in FIG. 12, the switching IC 121 is connected between the supply line 80a and the LD driver 69. The switching IC 122 is connected between the supply line 80a and the power stabilizing circuit 90. The switching IC 123 is connected between the power stabilizing circuit 90 and the LD driver 69. Each of the switching ICs 121 through 123 is connected to the CPU 124.

In operation, the CPU 124 monitors the supply line 80a and turns on/off the switching ICs 121 through 123 to automatically select the operation mode of the laser control system 100. For example, the CPU 124 turns on the switching IC 121 and turns off the switching ICs 122 and 123 to cause the laser control system 100 operate in the first mode. The CPU 124 turns off the switching IC 121 and turns on the switching ICs 122 and 123 to cause the laser control system 100 to operate in the second mode.

The embodiments with the two operation modes as shown in FIGS. 11 and 12 can provide the laser control system 100 with greater efficiency, enhancing usability of the power stabilizing circuit 90.

Figure 13:
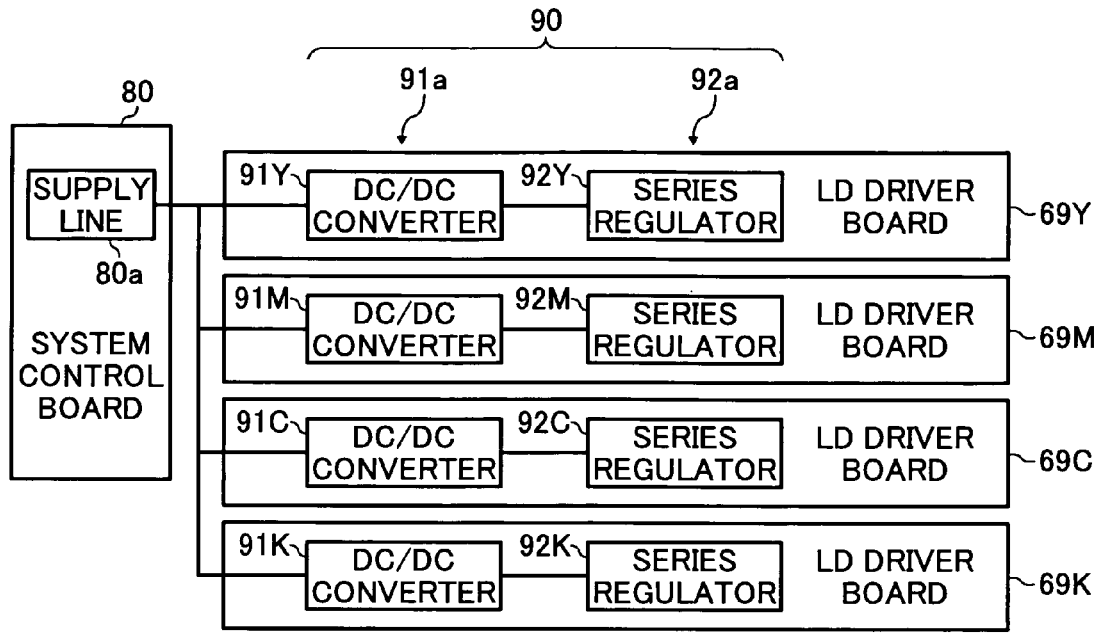
FIG. 13 is a block diagram illustrating an example arrangement of the power stabilizing circuit of FIG. 7 inserted in the laser control system of FIG. 5.

Referring now to FIG. 13, a block diagram illustrating an example arrangement of the power stabilizing circuit 90 inserted in the laser control system 100 is described.

In FIG. 13, the power stabilizing circuit 90 includes a boost circuit 91a and a regulation circuit 92a. The boost circuit 91a includes separate DC/DC converters 91Y, 91M, 91C, and 91K. The regulation circuit 92a includes separate series regulators 92Y, 92M, 92C, and 92K. Each DC/DC converter and each associated series regulator is connected to form a separate sub-unit mounted on each associated LD driver board.

The arrangement of FIG. 13 ensures a stable supply of voltage with little influence of transmission noise caused by connecting the power stabilizing circuit 90 to the LD driver 69. Further, this arrangement enables loads to be distributed among the separate sub-units, reducing interference between neighboring LD driver boards. Still further, this arrangement allows insertion of the power stabilizing circuit 90 without modification in a harness connecting the system control board 80 and the LD driver 69, so that no additional equipment is needed to adjust the harness connection.

Figure 14:
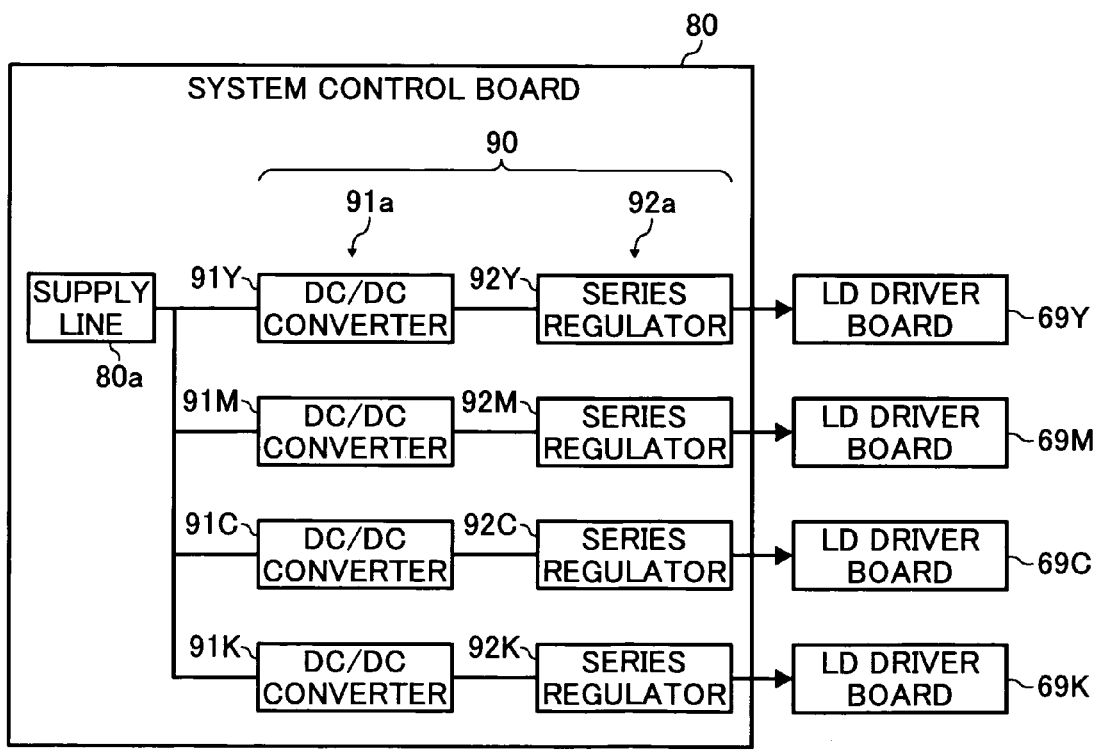
FIG. 14 is a block diagram illustrating another example arrangement of the power stabilizing circuit of FIG. 7 inserted in the laser control system of FIG. 5.

Referring to FIG. 14, a block diagram illustrating another example arrangement of the power stabilizing circuit 90 inserted in the laser control system 100 is described.

In FIG. 14, the power stabilizing circuit 90 includes the boost circuit 91a with the separate DC/DC converters 91Y, 91M, 91C, and 91K, and the regulation circuit 92a with the separate series regulators 92Y, 92M, 92C, and 92K. Each DC/DC converter and each associated series regulator is connected to form a separate sub-unit mounted on the system control board 80.

The arrangement of FIG. 14 enables loads to be distributed among the separate sub-units, reducing interference between neighboring LD driver boards. Further, this arrangement allows insertion of the power stabilizing circuit 90 without modifying components other than the system control board 80.

Figure 15:
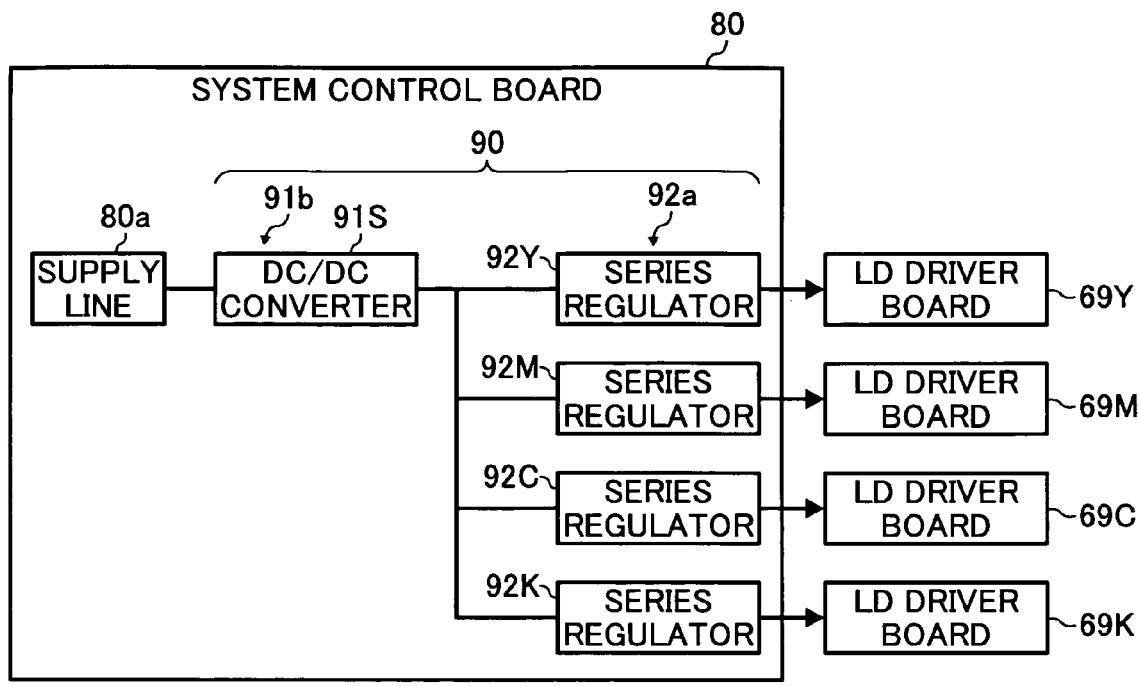
FIG. 15 is a block diagram illustrating another example arrangement of the power stabilizing circuit of FIG. 7 inserted in the laser control system of FIG. 5.

Referring to FIG. 15, a block diagram illustrating yet another example arrangement of the power stabilizing circuit 90 inserted in the laser control system 100 is described.

In FIG. 15, the power stabilizing circuit 90 includes a boost circuit 91b and the regulation circuit 92a. The boost circuit 91b includes a single DC/DC converter 91S. The regulation circuit 92a includes the separate series regulators 92Y, 92M, 92C, and 92K, each connected to the DC/DC converter 91S. The DC/DC converter 91S and the series regulators 92Y, 92M, 92C, and 92K are mounted together on the system control board 80.

The arrangement of FIG. 15 allows insertion of the power stabilizing circuit 90 without modifying components other than the system control board 80. Further, this arrangement involving only one DC/DC converter provides a cost advantage over arrangements using multiple DC/DC converters.

Figure 16:
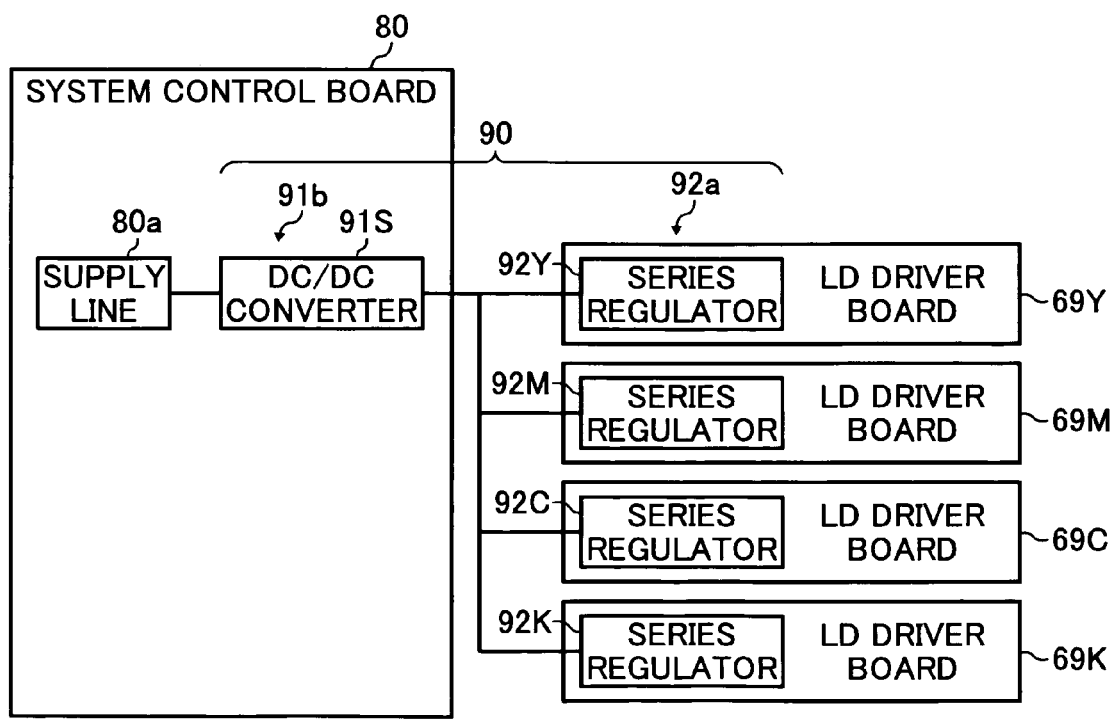
FIG. 16 is a block diagram illustrating another example arrangement of the power stabilizing circuit of FIG. 7 inserted in the laser control system of FIG. 5.

Referring to FIG. 16, a block diagram illustrating still yet another example arrangement of the power stabilizing circuit 90 inserted in the laser control system 100 is described.

In FIG. 16, the power stabilizing circuit 90 includes the boost circuit 91b with the single DC/DC converter 91S and the regulation circuit 92a with the separate series regulators 92Y, 92M, 92C, and 92K, each connected to the DC/DC converter 91S. The DC/DC converter 91S is mounted on the system control board 80 while each series regulator is mounted on each associated LD driver board.

The arrangement of FIG. 16 ensures a stable supply of voltage with little influence of transmission noise caused by connecting the power stabilizing circuit 90 to the LD driver 69. Further, this arrangement involving only one DC/DC converter provides a cost advantage over arrangements employing multiple DC/DC converters.

Figure 17:
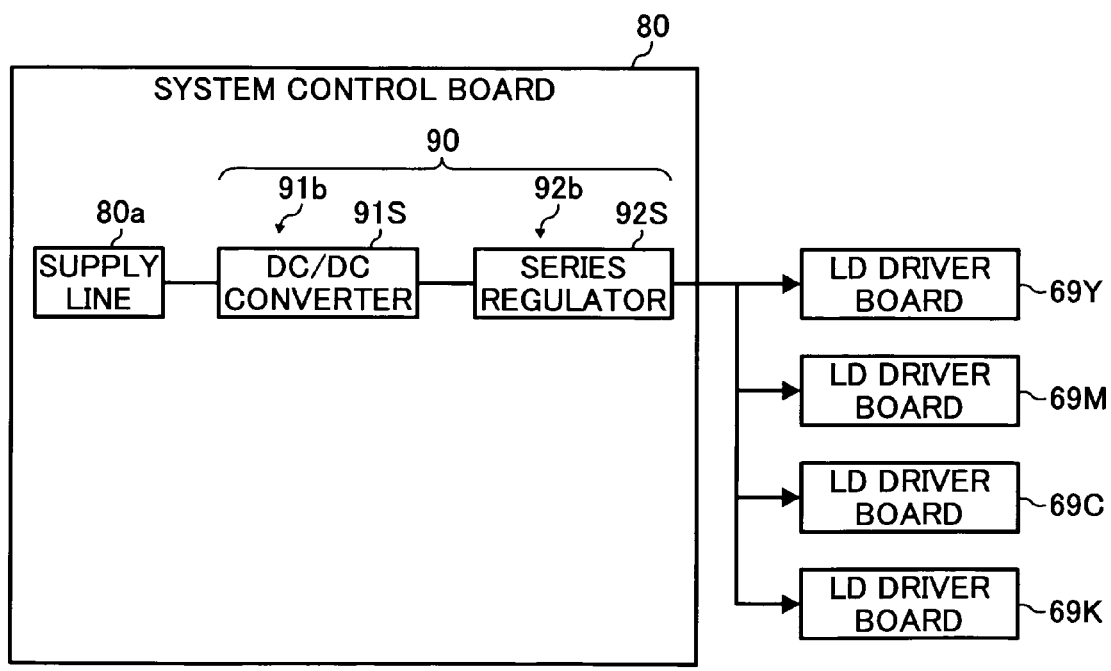
FIG. 17 is a block diagram illustrating another example arrangement of the power stabilizing circuit of FIG. 7 inserted in the laser control system of FIG. 5.

Referring to FIG. 17, a block diagram illustrating still yet another and further example arrangement of the power stabilizing circuit 90 inserted in the laser control system 100 is described.

In FIG. 17, the power stabilizing circuit 90 includes the boost circuit 91b with the single DC/DC converter 91S and a regulation circuit 92b with a single series regulator 92S. The DC/DC converter 91S and the series regulator 92S are connected and mounted together on the system control board 80.

The arrangement of FIG. 17 allows insertion of the power stabilizing circuit 90 without modifying components other than the system control board 80. Further, this arrangement involving only one DC/DC converter and one series regulator is cost-advantageous, space-saving, and easily implementable compared to those using multiple DC/DC converters and multiple series regulators.

Numerous additional modifications and variations are possible in light of the above teachings. It is therefore to be understood that, within the scope of the appended claims, the disclosure of this patent specification may be practiced otherwise than as specifically-described herein.

What is claimed as new and desired to be protected by Letters Patent of the United States is:

1. A control system for a laser source driven by a direct current drive voltage, the control system comprising:
   a system control board configured to output a control signal based on input data;
   a laser driver, being coupled to the laser source and to the system control board, configured to drive the laser source with the drive voltage to generate a laser beam modulated according to the control signal; and
   a power stabilizing circuit configured to regulate the drive voltage to a given constant level, the power stabilizing circuit including:
      a first circuit configured to boost the drive voltage to a level exceeding the given constant level by adding a given additional voltage to the drive voltage; and
      a second circuit configured to limit the boosted drive voltage to the given constant level by removing an excess voltage from the boosted drive voltage, the excess voltage being a difference between the boosted drive voltage and the given constant level.

2. The control system according to claim 1, further comprising a switching circuit configured to activate the power stabilizing circuit in a first mode and to deactivate the power stabilizing circuit in a second mode.

3. The control system according to claim 2, further comprising a switching control unit configured to control the switching circuit to select one of the first and second modes depending on a condition of the drive voltage.

4. The control system according to claim 1, wherein the laser source includes a plurality of laser diodes, the laser driver includes a plurality of circuit boards each operably associated with one of the plurality of laser diodes, and the power stabilizing circuit includes a plurality of functional units each operably associated with one of the plurality of circuit boards.

5. The control system according to claim 1, wherein the laser source includes a plurality of laser diodes, the laser driver includes a plurality of circuit boards each operably associated with one of the plurality of laser diodes, the first circuit includes a single unit, and the second circuit includes either of a single unit or a plurality of functional units each operably associated with one of the plurality of circuit boards.

6. The control system according to claim 1, wherein the power stabilizing circuit is mounted on the laser driver.

7. The control system according to claim 1, wherein the power stabilizing circuit is mounted on the system control board.

8. The control system according to claim 1, wherein the first circuit is mounted on the system control board and the second circuit is mounted on the laser driver.

9. An optical scanning device, comprising:
   a scanning system configured to scan an object surface with a laser beam;
   a laser source configured to emit the laser beam, the laser source being driven by a direct current drive voltage;
   a system control board configured to output a control signal based on input data;
   a laser driver, being coupled to the laser source and to the system control board, configured to drive the laser source with the drive voltage to generate a laser beam modulated according to the control signal; and
   a power stabilizing circuit configured to regulate the drive voltage to a given constant level, the power stabilizing circuit including:
      a first circuit configured to boost the drive voltage to a level exceeding the given constant level by adding a given additional voltage to the drive voltage; and
      a second circuit configured to limit the boosted drive voltage to the given constant level by removing an excess voltage from the boosted drive voltage, the excess voltage being a difference between the boosted drive voltage and the given constant level.

10. The optical scanning device according to claim 9, wherein the power stabilizing circuit further includes a switching circuit configured to activate the power stabilizing circuit in a first mode and to deactivate the power stabilizing circuit in a second mode.

11. The optical scanning device according to claim 10, wherein the power stabilizing circuit further includes a switching control unit configured to control the switching circuit to select one of the first and second modes depending on a condition of the drive voltage.

12. The optical scanning device according to claim 9, wherein the laser source includes a plurality of laser diodes, the laser driver includes a plurality of circuit boards each operably associated with one of the plurality of laser diodes, and the power stabilizing circuit includes a plurality of functional units each operably associated with one of the plurality of circuit boards.

13. The optical scanning device according to claim 9, wherein the laser source includes a plurality of laser diodes, the laser driver includes a plurality of circuit boards each operably associated with one of the plurality of laser diodes, the first circuit includes a single unit, and the second circuit includes either of a single unit or a plurality of functional units each operably associated with one of the plurality of circuit boards.

14. An image forming apparatus, comprising:
   an optical scanning unit configured to form an electrostatic latent image on a photoconductor surface, the optical scanning unit including:
      a scanning system configured to scan the photoconductor surface with a laser beam;
      a laser source configured to emit the laser beam, the laser source being driven by a direct current drive voltage;
      a system control board configured to output a control signal based on image data;
      a laser driver, being coupled to the laser source and to the system control board, configured to drive the laser source with the drive voltage to generate a laser beam modulated according to the control signal; and a power stabilizing circuit configured to regulate the drive voltage to a given constant level, the power stabilizing circuit including:

a first circuit configured to boost the drive voltage to a level exceeding the given constant level by adding a given additional voltage to the drive voltage; and a second circuit configured to limit the boosted drive voltage to the given constant level by removing an excess voltage from the boosted drive voltage, the excess voltage being a difference between the boosted drive voltage and the given constant level.

15. The image forming apparatus according to claim 14, wherein the power stabilizing circuit further includes a switching circuit configured to activate the power stabilizing circuit in a first mode and to deactivate the power stabilizing circuit in a second mode.

16. The image forming apparatus according to claim 15, wherein the power stabilizing circuit further includes a switching control unit configured to control the switching circuit to select one of the first and second modes depending on a condition of the drive voltage.

17. The image forming apparatus according to claim 14, wherein the laser source includes a plurality of laser diodes, the laser driver includes a plurality of circuit boards each operably associated with one of the plurality of laser diodes, and the power stabilizing circuit includes a plurality of functional units each operably associated with one of the plurality of circuit boards.

18. The image forming apparatus according to claim 14, wherein the laser source includes a plurality of laser diodes, the laser driver includes a plurality of circuit boards each operably associated with one of the plurality of laser diodes, the first circuit includes a single unit, and the second circuit includes either of a single unit or a plurality of functional units each operably associated with one of the plurality of circuit boards.

* * * * *